(12) United States Patent
Praetorius et al.

(10) Patent No.: US 9,587,048 B2
(45) Date of Patent: Mar. 7, 2017

(54) METHODS OF PREPARING A CATALYST

(71) Applicant: Chevron Phillips Chemical Company LP, The Woodlands, TX (US)

(72) Inventors: Jeremy M. Praetorius, Bartlesville, OK (US); Eric D. Schwerdtfeger, Bartlesville, OK (US); Max P. McDaniel, Bartlesville, OK (US); Ted H. Cymbaluk, Seabrook, TX (US); Connor D. Boxell, Tulsa, OK (US); Kathy S. Collins, Bartlesville, OK (US); Alan L. Solenberger, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/699,533

(22) Filed: Apr. 29, 2015

(65) Prior Publication Data

US 2016/0319052 A1    Nov. 3, 2016

(51) Int. Cl.
 *C08F 110/02* (2006.01)
(52) U.S. Cl.
 CPC .................... *C08F 110/02* (2013.01)
(58) Field of Classification Search
 CPC ..................................................... C08F 110/02
 See application file for complete search history.

(56) References Cited

U.S. PATENT DOCUMENTS

| 3,248,179 A | 4/1966 | Norwood |
| 3,622,521 A | 11/1971 | Hogan et al. |
| 3,780,011 A | 12/1973 | Pullukat et al. |

(Continued)

FOREIGN PATENT DOCUMENTS

| EP | 0033953 A2 | 8/1981 |
| EP | 0085857 B1 | 8/1983 |

(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

*Primary Examiner* — Catherine S Branch
(74) *Attorney, Agent, or Firm* — Conley Rose, P.C.; Rodney B. Carroll; Cheryl L. Huseman

(57) ABSTRACT

A method comprising a) calcining a silica support at temperature in the range of from about 100° C. to about 500° C. to form a precalcined silica support; b) contacting the precalcined silica support with a titanium alkoxide to form a titanated support; c) subsequent to b), contacting the titanated support with a polyol to form a polyol associated titanated support (PATS); d) contacting at least one of the silica support, pre-calcined silica support, the titanated support, the PATS, or combinations thereof with a chromium-containing compound to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

28 Claims, 5 Drawing Sheets

(56) References Cited

U.S. PATENT DOCUMENTS

| | | |
|---|---|---|
| 3,875,079 A | 4/1975 | Witt |
| 3,887,494 A | 6/1975 | Dietz |
| 4,041,224 A | 8/1977 | Hoff et al. |
| 4,247,421 A | 1/1981 | McDaniel et al. |
| 4,280,141 A | 7/1981 | McCann et al. |
| 4,312,967 A | 1/1982 | Norwood et al. |
| 4,402,864 A | 9/1983 | McDaniel |
| 4,405,501 A | 9/1983 | Witt |
| 4,405,768 A | 9/1983 | McDaniel |
| 4,434,243 A | 2/1984 | Martin |
| 4,442,275 A | 4/1984 | Martin |
| 4,446,243 A | 5/1984 | Chester et al. |
| 4,501,885 A | 2/1985 | Sherk et al. |
| 4,547,557 A | 10/1985 | McDaniel |
| 4,588,790 A | 5/1986 | Jenkins, III et al. |
| 4,981,831 A | 1/1991 | Knudsen et al. |
| 5,183,792 A | 2/1993 | Wang et al. |
| 5,284,926 A | 2/1994 | Benham et al. |
| 5,352,749 A | 10/1994 | DeChellis et al. |
| 5,426,082 A | 6/1995 | Marsden |
| 5,436,304 A | 7/1995 | Griffin et al. |
| 5,455,314 A | 10/1995 | Burns et al. |
| 5,478,898 A | 12/1995 | Standaert |
| 5,565,175 A | 10/1996 | Hottovy et al. |
| 5,575,979 A | 11/1996 | Hanson et al. |
| 5,576,262 A | 11/1996 | Denton |
| 5,599,762 A | 2/1997 | Dneton |
| 5,914,291 A | 6/1999 | Marsden et al. |
| 6,239,235 B1 | 5/2001 | Hottovy et al. |
| 6,262,191 B1 | 7/2001 | Hottovy et al. |
| 6,489,428 B1 | 12/2002 | Debras et al. |
| 6,624,324 B2 | 9/2003 | Iwakura et al. |
| 6,657,023 B2 | 12/2003 | Bergmeister et al. |
| 6,707,498 B1 | 3/2004 | Toma et al. |
| 6,833,415 B2 | 12/2004 | Kendrick et al. |
| 6,855,781 B2 | 2/2005 | Bergmeister et al. |
| 7,088,394 B2 | 8/2006 | Rossi et al. |
| 7,390,395 B2 | 6/2008 | Elomari |
| 7,700,516 B2 | 4/2010 | McDaniel et al. |
| 9,023,967 B2 | 5/2015 | Yu et al. |
| 9,096,699 B2 | 8/2015 | McDaniel et al. |
| 2003/0007083 A1 | 1/2003 | Rossi et al. |
| 2004/0026324 A1 | 2/2004 | Luca |
| 2005/0153830 A1 | 7/2005 | Jensen et al. |
| 2007/0034549 A1 | 2/2007 | Elomari |
| 2014/0295178 A1 | 10/2014 | Watanabe et al. |
| 2015/0203614 A1 | 7/2015 | Yu et al. |

FOREIGN PATENT DOCUMENTS

| | | |
|---|---|---|
| EP | 0088989 A2 | 9/1983 |
| EP | 0314385 A2 | 5/1989 |
| EP | 0337365 A2 | 10/1989 |
| EP | 0339571 A1 | 11/1989 |
| EP | 0439294 A1 | 7/1991 |
| EP | 0455444 A1 | 11/1991 |
| EP | 0589643 A1 | 3/1994 |
| EP | 0882743 B1 | 12/1998 |
| EP | 0882744 A1 | 12/1998 |
| EP | 1845110 A1 | 10/2007 |
| WO | 9311173 A1 | 6/1993 |
| WO | 2009042149 A2 | 4/2009 |
| WO | 2009042149 A3 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2013082346 A3 | 6/2013 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

Conway, Steven J., et al., "Chromia/silica-titania cogel catalysts for ethene polymerisation," J. Chem. Soc., Faraday Trans., 1989, pp. 71-78, vol. 85, No. 1.

Conway, Steven J., et al., "Chromia/silica-titania cogel catalysts for ethene polymerisation," J. Chem. Soc., Faraday Trans., 1989, pp. 79-90, vol. 85, No. 1.

Conway, Steven J., et al., "Chromia/silica-titania cogel catalysts for ethene polymerisation," J. Chem. Soc., Faraday Trans., 1989, pp. 1841-1851, vol. 85, No. 7.

Ellison, Alan, et al., "Characterisation of cr/silica catalysts," J. Chem. Soc. Faraday Trans., 1993, pp. 4393-4395, vol. 89, No. 24.

Ellison, Alan, et al., "Characterisation of modified cr-silica catalysts," Journal of Molecular Catalysis, 1994, pp. 81-86, vol. 90, Elsevier Science B.V.

Filing receipt and specification for patent application entitled "Methods of Preparing a Catalyst," by Jeremy M. Praetorius, et al., filed Sep. 18, 2015 as U.S Appl. No. 14/858,512.

Foreign communication from a related counterpart application—International Search Report and Written Opinion, PCT/US2008/011068, Mar. 23, 2009, 18 pages.

Foreign communication from a related counterpart application—International Preliminary Report on Patentability, PCT/US2008/011068, Mar. 30, 2010, 11 pages.

Foreign communication from a related counterpart application—Partial Search Report, Annex to Form PCT/ISA/206, PCT/US2012/067175, Apr. 12, 2013, 4 pages.

Foreign communication from a related counterpart application—International Search Report and Written Opinion, PCT/US2012/067175, Jun. 18, 2013, 23 pages.

Foreign communication from a related counterpart application—International Preliminary Report on Patentability, PCT/US2012/067175, Jun. 3, 2014, 16 pages.

Foreign communication from a related counterpart application—International Search Report and Written Opinion, PCT/US2012/064986, Jan. 25, 2013, 8 pages.

Foreign communication from a related counterpart application—International Preliminary Report on Patentability, PCT/US2012/064986, Jun. 3, 2014, 5 pages.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.

McDaniel, M. P., et al., "The activation of the phillips polymerization catalyst," Journal of Catalysis, 1983, pp. 118-126, vol. 82, Academic Press, Inc.

Product Information, "LUDOX® SM-AS Colloidal Silica," 2005, W. R. Grace & Co.-Conn., 2 pages.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.

Yu, Youlu, et al., "SEC-MALS method for the determination of long-chain branching and long-chain branching distribution in polyethylene," Polymer, 2005, pp. 5165-5182, vol. 46, Elsevier Ltd.

Yu, Youlu, et al., "Size-exclusion chromatography coupled to multiangle light scattering detection of long-chain branching in

(56) References Cited

OTHER PUBLICATIONS polyethylene made with phillips catalyst," Journal of Polymer Science Part A: Polymer Chemistry, 2012, vol. 50, pp. 1166-1173, Wiley Periodicals, Inc.
Office Action dated Jul. 28, 2016 (30 pages), U.S. Appl. No. 14/676,581, filed Apr. 1, 2015.
Foreign communication from a related counterpart application—International Search Report, PCT/US2016/029327, Aug. 24, 2016, 4 pages.

US 9,587,048 B2

METHODS OF PREPARING A CATALYST

TECHNICAL FIELD

The present disclosure relates to catalyst compositions. More specifically, the present disclosure relates to methods of preparing olefin polymerization catalyst compositions.

BACKGROUND

Enhancements in preparation methods for olefin polymerization catalysts can reduce the costs associated with catalyst production and improve process economics. For example, during catalyst production, materials such as highly reactive volatile organic compounds (HRVOC) may be emitted. HRVOCs play a role in the formation of ozone in ozone nonattainment areas, i.e., areas that do not meet the Environmental Protection Agency's air quality standards for ground-level ozone. Consequently, processes that result in the production of HRVOCs may be subject to compliance with various state and federal regulations regarding HRVOC emission, such as the HRVOC emissions cap and trade program (HECT). Thus, there is an ongoing need to develop improved processes for the production of catalysts that result in decreased HRVOC emissions.

SUMMARY

A method comprising a) calcining a silica support at temperature in the range of from about 100° C. to about 500° C. to form a precalcined silica support; b) contacting the precalcined silica support with a titanium alkoxide to form a titanated support; c) subsequent to b), contacting the titanated support with a polyol to form a polyol associated titanated support (PATS); d) contacting at least one of the silica support, pre-calcined silica support, the titanated support, the PATS, or combinations thereof with a chromium-containing compound to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A method comprising a) calcining a silica support at temperature in the range of from about 100° C. to about 500° C. to form a precalcined silica support; b) contacting the precalcined silica support with a titanium alkoxide to form a titanated support; c) subsequent to b), contacting the titanated support with a polyol to form a polyol associated titanated support (PATS); d) contacting the PATS with a chromium-containing compound to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A method comprising a) calcining a silica support at temperature in the range of from about 100° C. to about 500° C. to form a precalcined silica support; b) contacting the precalcined silica support with a chromium-containing compound to form a Cr/silica support; c) contacting the Cr/silica support with a titanium alkoxide to form a titanated support; d) subsequent to c), contacting the titanated support with a polyol to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A method comprising a) calcining a silica support at temperature in the range of from about 100° C. to about 500° C. to form a precalcined silica support; b) contacting the precalcined silica support with a titanium alkoxide to form a titanated support; c) contacting the titanated support with a chromium-containing compound to form a Cr/Ti support; d) subsequent to c), contacting the Cr/Ti support with a polyol to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A method comprising a) calcining a Cr/silica support at temperature in the range of from about 100° C. to about 500° C. to form a precalcined support; b) contacting the precalcined support with a titanium alkoxide to form a titanated support; c) subsequent to b), contacting the titanated support with a polyol to form a polyol associated titanated support (PATS); d) drying the PATS to form a dried polymerization catalyst precursor; and e) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

DETAILED DESCRIPTION

Figure 1:
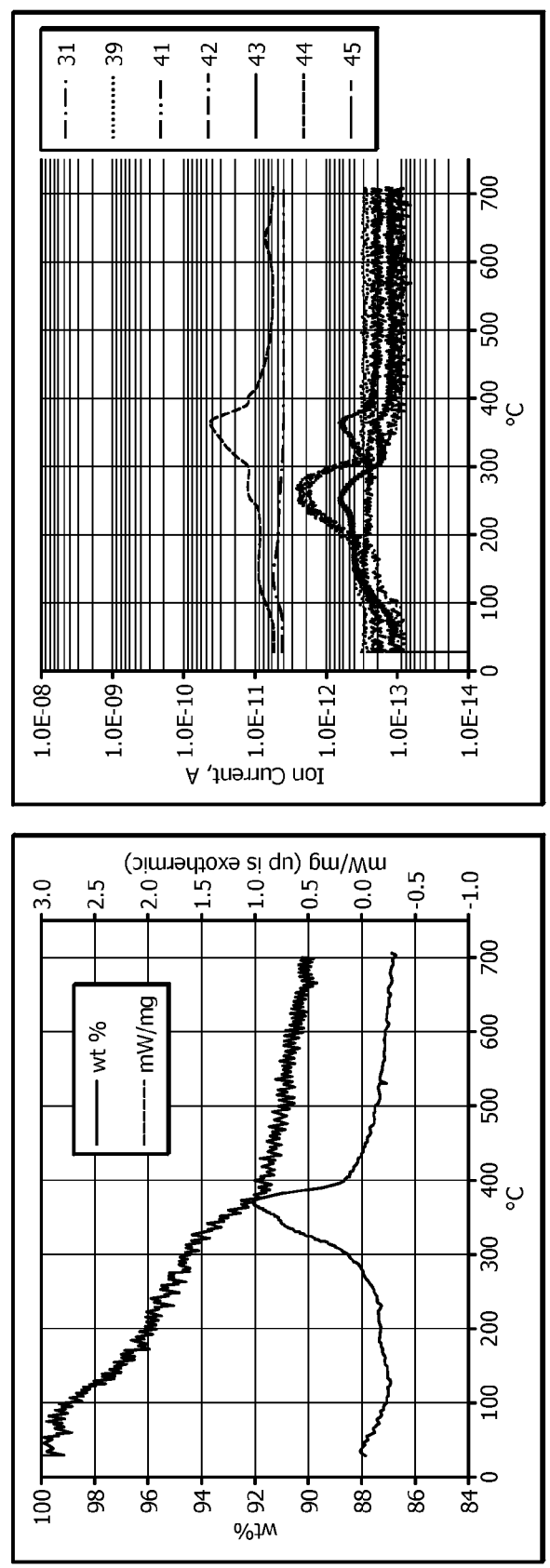
FIGS. 1-5 are thermogravimetric/mass spectra for the samples from Example 2.

Disclosed herein are methods for the preparation of a polymerization catalyst. In an embodiment, the method comprises contacting a silica-support material and a titanium-containing compound to form a titanated support, and subsequent thereto contacting the titanated support with a polyol to form a polyol associated titanated support (PATS). Chromium may be added to the support (e.g., the PATS) at any suitable time during the method via contact of the support with a chromium-containing compound, thereby yielding a polymerization catalyst precursor. The polymerization catalyst precursor may be heat-treated and during heat treatment the amount of HRVOCs emitted may be less than the amount emitted during heat treatment of an otherwise similar material formed in the absence of a polyol. The methodologies disclosed herein result in a catalyst whose preparation has a reduced emission of HRVOCs and are herein designated reduced emissions catalysts (RECs). Embodiments of various specific method sequences of contacting the catalyst components to yield the PATS and/or the RECs are disclosed in more detail herein.

In an embodiment, a silica-support material (e.g., silica support) suitable for use in the present disclosure may have a surface area and pore volume effective to provide for the production of an active catalyst (e.g., a REC). In an embodiment, the silica-support material possesses a surface area in the range of from about 10 m$^2$/gram to about 1000 m$^2$/gram, alternatively from about 100 m$^2$/gram to about 700 m$^2$/gram, alternatively from about 200 m$^2$/gram to about 600 m$^2$/gram, or alternatively from about 250 m$^2$/gram to about 550 m$^2$/gram. The silica-support material may be further characterized by a pore volume of greater than about 0.5 cm$^3$/gram, alternatively greater than about 0.9 cm$^3$/gram, alternatively greater than about 1.1 cm$^3$/gram, or alternatively greater than about 1.5 cm$^3$/gram. In an embodiment, the silica-support material is characterized by a pore volume ranging from about 0.5 cm$^3$/gram to about 1.5 cm$^3$/gram. The silica-support material may be further characterized by an average particle size of from about 10 microns to about 500 microns, alternatively about 25 microns to about 300 microns, or alternatively about 40 microns to about 150 microns. Generally, the average pore size of the silica-support material ranges from about 10 Angstroms to about 1000 Angstroms. In one embodiment, the average pore size of the silica-support material is in the range of from about 50 Angstroms to about 500 Angstroms, while in yet another embodiment the average pore size ranges from about 75 Angstroms to about 350 Angstroms.

The silica-support material may contain greater than about 50 percent (%) silica, alternatively greater than about 80% silica, alternatively greater than about 90% silica by weight of the silica-support material. The silica-support material may be prepared using any suitable method, for example the silica-support material may be prepared synthetically by hydrolyzing tetrachlorosilane (SiCl$_4$) with water or by contacting sodium silicate with a mineral acid. An example of silica-support material suitable for use in this disclosure includes without limitation ES70 which is a silica-support material with a surface area of 300 m$^2$/g, and a pore volume of 1.6 cc/g that is commercially available from PQ Corporation. The silica-support material may include additional components that do not adversely affect the REC, such as zirconia, alumina, thoria, magnesia, fluoride, sulfate, phosphate, or mixtures thereof.

The silica-support material may be present in the REC in an amount of from about 50 weight percent (wt. %) to about 99 wt. %, or alternatively from about 80 wt. % to about 99 wt. %. Herein the percentage of support refers to the final weight percent of support associated with the catalyst by total weight of the catalyst after all processing steps.

In an embodiment, the titanium-containing compound comprises a tetravalent titanium (Ti$^{4+}$)-containing compound. The Ti$^{4+}$-containing compound may be any compound that comprises tetravalent titanium, alternatively the Ti$^{4+}$-containing compound may be any compound that is soluble in an aqueous solution and able to release a Ti$^{4+}$ species into solution. In an embodiment, the titanium-containing compound is an organotitanium containing at least one alkoxide. Alternatively, the titanium-containing compound comprises a titanium tetraalkoxide. In an embodiment, the titanium alkoxide is titanium isopropoxide Ti(OiPr)$_4$, titanium ethoxide Ti(OEt)$_4$, titanium n-propoxide Ti(nOPr)$_4$, titanium butoxide Ti(OBu)$_4$, titanium 2-ethyl-hexoxide, or combinations thereof.

The amount of titanium present in the REC may range from about 0.1 wt. % to about 10 wt. % titanium by weight of the REC, alternatively from about 0.5 wt. % to about 5 wt. % titanium, alternatively from about 0.1 wt. % to about 4 wt. %, or alternatively from about 2 wt. % to about 4 wt. %. Herein the percentage titanium refers to the final weight percent titanium associated with the catalyst composition by total weight of the catalyst composition after all processing steps.

In various embodiments, the silica-support material and titanium-containing compound are pre-contacted in the absence of a polyhydric alcohol (e.g., a polyalcohol or polyol) to form a titanated support, and the polyol is subsequently contacted with the titanated support. In some embodiments, the polyol can comprise any hydrocarbon having at least 2 alcohol groups (or alternatively called hydroxy groups); alternatively, at least 3 alcohol groups; or alternatively, at least 4 alcohol groups. In an embodiment, the polyol is an aliphatic hydrocarbon comprising at least two alcohol groups. In some embodiments, the polyol is a glycol, a sugar, a reduced sugar, an oligomer of a glycol, or combinations thereof.

In an aspect, the polyol can be an aliphatic polyol such as ethylene glycol, diethylene glycol, triethylene glycol, tetraethylene glycol, tripropylene glycol, polyethylene glycols with a molecular weight of from 106 to 8500, polyethylene glycols with a molecular weight of from 400 to 2000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanetriol, 2,2,4-trimethyl-1,3-pentanediol, or combinations thereof.

In an aspect, the polyol can be a cyclic aliphatic polyol such as 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,4-cyclohexanedimethanol, bis(4-hydroxycyclohexyl)methane, 2,2-bis(4-hydroxy-cyclohexyl)propane, or any combination thereof.

In an aspect, the polyol can be an aralkyl polyol such as 1-phenyl-1,2-ethanediol, 1,2-benzenedimethanol, 1,3-benzene-di-methanol, 1,4-benzene-dimethanol, or mixtures thereof. In an aspect, the polyol can be an aromatic polyol such as 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 2-(2-hydroxyphenyl)ethanol, 2-(3-hydroxy-phenyl)-ethanol, 2-(4-hydroxyphenyl)-ethanol, 2-phenyl-1,2-propanediol or mixtures thereof.

In an embodiment, the polyol is a sugar alcohol which refers to the hydrogenated forms of the aldoses or ketoses of a sugar. For example, glucitol, also known as sorbitol, has the same linear structure as the chain form of glucose, but the aldehyde (—CHO) group is replaced with a —CH$_2$OH group. Other common sugar alcohols include the monosaccharides erythritol and xylitol and the disaccharides lactitol and maltitol.

Generally, sugar alcohols can be characterized by the general formula HO—CH$_2$—(CH—OH)$_n$—CH$_2$—OH, wherein n is typically from 1 to 22. For example, when n=2, the sugar alcohol can be erythritol, threitol, etc. For example, when n=3, the sugar alcohol can be arabitol, xylitol, ribitol, etc. For example, when n=4, the sugar alcohol can be mannitol, sorbitol, etc. The most common sugar alcohols have 5 or 6 carbon atoms in their structure; wherein n is 3 or 4, respectively. In an embodiment, the sugar alcohol comprises mannitol, sorbitol, arabitol, threitol, xylitol, ribitol, galactitol, fruitol, iditol, inositol, volemitol, isomalt, malitol, lactitol, or combinations thereof.

In an embodiment, the polyol comprises ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or combinations thereof. In an embodiment, the polyol is selected from the group consisting of ethylene glycol, glycerol, propylene glycol, butane glycol, lactic acid or combinations thereof.

In an embodiment, the polyol is present in an amount sufficient to provide from about 0.1 to about 10 molar equivalents of polyol per mole of titanium, alternatively from about 0.5 to about 5, alternatively from about 1 to about 4, or alternatively from about 2 to about 4.

In various embodiments, chromium can be added to the support (to yield a REC comprising chromium) via contact of the silica-support material with one or more chromium-containing compounds. The chromium-containing compound may be a water-soluble compound or a hydrocarbon-soluble compound. Examples of water-soluble chromium compounds include chromium trioxide, chromium acetate, chromium nitrate, or combinations thereof. Examples of hydrocarbon-soluble chromium compounds include tertiary butyl chromate, a diarene chromium (0) compound, biscyclopentadienyl chromium(II), chromium (III) acetylacetonate, or combinations thereof. In one embodiment, the chromium-containing compound may be a chromium (II) compound, chromium (III) compound, or combinations thereof. Suitable chromium (III) compounds include, but are not limited to, chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, chromium (III) acetate. Suitable chromium (II) compounds include, but are not limited to, chromous chloride, chromous bromide, chromous iodide, chromium (II) sulfate, chromium (II) acetate, or combinations thereof.

The amount of chromium present in the catalyst may range from about 0.1 wt. % to about 10 wt. % by weight of the REC, alternatively from about 0.25 wt. % to about 3 wt. %, or alternatively from about 0.5 wt. % to about 1.5 wt. %. Herein, the percentage chromium refers to the final percent chromium associated with the support material by total weight of the material after all processing steps.

In an embodiment, a method of preparing a REC of the type disclosed herein comprises contacting a silica-support material with a titanium-containing compound to form a titanated support prior to contact of the titanated support with a polyol. Chromium can be added at any suitable time or step of the method by contacting the support with a chromium-containing compound. The silica-support material may be used as prepared or as obtained from commercial sources. Alternatively, the silica-support material may be calcined prior to utilization in the preparation of a REC (e.g., prior to contact with any of the other catalyst components such as titanium alkoxide, polyol, and/or chromium-containing compound). For example, the silica-support material may be calcined at a temperature of from about 100° C. to about 500° C., alternatively from about 125° C. to about 300° C., or alternatively from about 150° C. to about 200° C. for a time period of from about 30 minutes to about 24 hours, alternatively from about 1 hour to about 12 hours, or alternatively from about 1 hour to about 8 hours to produce a precalcined silica-support material. Hereinafter, the disclosure will refer to the use of a precalcined silica-support material although it is to be understood that silica-support material may or may not have been subjected to a precalcination procedure of the type disclosed herein.

In an embodiment, the precalcined silica-support material is contacted with a titanium containing compound, both of the type disclosed herein, to produce a titanated silica support. The contacting may be carried out using any suitable method, for example, via ion-exchange, incipient wetness, pore fill, aqueous impregnation, organic solvent impregnation, melt coating, co-gelling, and the like. The titanated silica support material may subsequently be contacted with a polyol (e.g., ethylene glycol) to produce a polyol associated titanated silica support (PATS). Contacting of the titanated silica-support material and polyol may be carried out in the presence of any suitable solvent. For example, the solvent may be an anhydrous organic solvent. In an embodiment, the solvent comprises alcohols, ketones, aliphatic hydrocarbons, aromatic hydrocarbons, halocarbons, ethers, acetonitrile, esters, or combinations thereof. Alternatively the solvent comprises alcohols, ketones, esters, or combinations thereof.

Aliphatic hydrocarbons which can be useful as a solvent include $C_3$ to $C_{20}$ aliphatic hydrocarbons; alternatively, $C_4$ to $C_{15}$ aliphatic hydrocarbons; or alternatively, $C_5$ to $C_{10}$ aliphatic hydrocarbons. The aliphatic hydrocarbons can be cyclic or acyclic and/or can be linear or branched, unless otherwise specified. Non-limiting examples of suitable acyclic aliphatic hydrocarbon solvents that can be utilized singly or in any combination include propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof. Aromatic hydrocarbons which can be useful as a solvent include $C_6$ to $C_{20}$ aromatic hydrocarbons; or alternatively, $C_6$ to $C_{10}$ aromatic hydrocarbons. Non-limiting examples of suitable aromatic hydrocarbons that can be utilized singly or in any combination in the present disclosure include benzene, toluene, xylene (including ortho-xylene, meta-xylene, para-xylene, or mixtures thereof), and ethylbenzene, or combinations thereof.

Halogenated aliphatic hydrocarbons which can be useful as a solvent include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. The halogenated aliphatic hydrocarbons can be cyclic or acyclic and/or can be linear or branched, unless otherwise specified. Non-limiting examples of suitable halogenated aliphatic hydrocarbons which can be utilized include methylene chloride, chloroform, carbon tetrachloride, dichloroethane, trichloroethane, and combinations thereof; alternatively, methylene chloride, chloroform, dichloroethane, trichloroethane, and combinations thereof. Halogenated aromatic hydrocarbons which can be useful as a solvent include $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof.

Esters, ketones, or alcohols which can be useful as a solvent include $C_1$ to $C_{20}$, esters, ketones, or alcohols; alternatively, $C_1$ to $C_{10}$ esters, ketones, aldehydes, or alcohols; or alternatively, $C_1$ to $C_5$ esters, ketones, aldehydes, or alcohols. Non-limiting examples of suitable esters which can be utilized as a solvent include ethyl acetate, propyl acetate, butyl acetate, isobutyl isobutyrate, methyl lactate, ethyl lactate, and combinations thereof. Non-limiting examples of suitable ketones which can be utilized as a solvent include acetone, ethyl methyl ketone, methyl isobutyl ketone, and combinations thereof. Non-limiting examples of suitable alcohols which can be utilized as a solvent include methanol, ethanol, propanol, isopropanol, n-butanol, isobutanol, pentanol, hexanol, heptanol, octanol, benzyl alcohol, phenol, cyclohexanol, and the like, or combinations thereof. In an embodiment, the solvent comprises methanol, ethanol, isopropanol, propanol, butanol, acetone, methylethylketone, ethyl acetate, heptane, or combinations thereof.

In an embodiment, the method further comprises drying the PATS. For example the PATS may be dried at a temperature of from about 40° C. to about 300° C., alternatively from about 80° C. to about 200° C., or alternatively from about 100° C. to about 200° C. for a time period of from about 30 min to about 24 hours, or alternatively from about 1 hour to about 12 hours to form a dried PATS. In an embodiment, the dried PATS is subsequently contacted with the chromium-containing compound to form a chromium-containing PATS. Contacting of the dried PATS with the chromium-containing compound may be carried out using any suitable methodology such as incipient wetness impregnation for example. In an embodiment, the chromium-containing PATS (e.g., catalyst precursor) is activated to form the REC. In alternative embodiments, the chromium may be added to the support (and the resultant catalyst, e.g., polymerization catalyst) at any suitable time in the overall catalyst production process. For example, in alternative embodiments, the chromium may be added by contacting at least one of a silica support, a pre-calcined silica support, a titanated support, a PATS, or combinations thereof with a chromium-containing compound.

In some embodiments, a method of forming a REC comprises contacting a precalcined silica-support material with a chromium-containing compound to form a chromium-containing silica support material. The resulting chromium-containing silica-support material may then be contacted with a titanium-containing compound to form a Cr/Ti/Si material. The Cr/Ti/Si material may be dried to form a dried Cr/Ti/Si material under conditions similar to those disclosed herein for drying a PATS. The dried Cr/Ti/Si material may be contacted with a polyol in the presence of a solvent to form a chromium-containing PATS (e.g., a catalyst precursor) which can subsequently be activated to form a REC.

In an embodiment, a methodology for formation of a REC comprises contacting of the titanium-containing compound and silica-support material prior to the addition of a polyol.

In an embodiment, the chromium-containing PATS is heat treated (e.g., calcined) to form a REC. Heat treatment of the chromium-containing PATS may be carried out using any suitable method, e.g., fluidization. Without wishing to be limited by theory, heat treatment of the chromium-containing support may result in an increase in the amount of hexavalent chromium present in the catalyst. In an embodiment, heat treatment of the chromium-containing PATS is carried out in any suitable atmosphere, such as air, oxygen, inert gases (e.g., Ar), or carbon monoxide by heating to a temperature of from about 400° C. to about 1000° C., alternatively from about 500° C. to about 900° C., alternatively from about 550° C. to about 850° C., or alternatively from about 550° C. to about 750° C. Heat treatment may be carried out for a period of time ranging from about 30 minutes to about 24 hours, alternatively from about 1 hour to about 12 hours, or alternatively from about 4 hours to about 8 hours.

In an embodiment, one or more of the steps described previously herein for the preparation of a REC may be carried out in a reactor or reactor system. In an alternative embodiment, one or more of the steps described previously herein for the preparation of a REC may be carried out outside of a reactor or reactor system. In such embodiments, one or more preparation parameters (e.g., heat treatment of the chromium-containing PATS) may be adjusted to facilitate formation of the REC. The resulting material is a REC which may function as a polymerization catalyst when employed in a polymerization reaction/system.

The catalysts of the present disclosure (i.e., RECs) are suitable for use in any olefin polymerization method, using various types of polymerization reactors. In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the RECs prepared as described herein. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth.

In an embodiment, a REC prepared as disclosed herein results in a reduction in the level of HRVOCs produced during the catalyst preparation. For example, the HRVOCs may comprise hydrocarbons, aromatic compounds, alcohols, ketones, or combinations thereof. In an embodiment, the HRVOCs comprise alkenes, alternatively propylene, butene, ethylene, or combinations thereof. RECs produced as disclosed herein may be characterized by HRVOC emissions that are reduced by from about 50% to about 99% when compared to the emissions from an otherwise similar catalyst prepared in the absence of a polyol. Alternatively, emissions of HRVOCs from RECs prepared as disclosed herein are reduced by greater than about 50%, alternatively greater than about 75%, alternatively greater than about 90%, or alternatively greater than about 99% wherein compared to an otherwise similar catalyst prepared in the absence of a polyol. In an embodiment, HRVOCs emissions during preparation of RECs of the type disclosed herein are less than about 1 wt. % based on the total weight of the catalyst, alternatively less than about 0.5 wt. %, or alternatively less than about 0.1 wt. %. In an embodiment, the HRVOC is propylene and the REC has emissions of from about 50 wt. % to about 1 wt. % based on the weight percent of titanium in the REC, alternatively less than about 20 wt. %, alternatively less than about 10 wt. %, or alternatively less than about 1 wt. %.

EXAMPLES

The following examples are given as particular embodiments of the disclosure and to demonstrate the practice and advantages thereof. It is understood that the examples are given by way of illustration and are not intended to limit the specification or the claims to follow in any manner.

The high load melt index (HLMI) of a polymer resin represents the rate of flow of a molten resin through an orifice of 0.0825 inch diameter when subjected to a force of 21,600 grams at 190° C. The HLMI values are determined in accordance with ASTM D1238 condition E.

Polymerizations were performed in 1.2 L isobutane at 100° C. and 550 psi of ethylene with 5 mL of 1-hexene and run to a productivity of 3200 g PE/g catalyst. The catalyst activity was determined by dividing the mass of polymer recovered from the reaction by the active polymerization time.

Example 1

Four catalysts were prepared and the effects of the presence of polyol during preparation on the catalyst properties were investigated. Various properties of the catalysts of the present disclosure, designated S1-S4, are compared to that of a control catalyst, designated CONT, prepared in the absence of a polyol in Table 1.

TABLE 1

| Catalyst | Titanium Source | Additive | Activity | HLMI | Solvent |
|---|---|---|---|---|---|
| CONT | Ti(OiPr)$_4$ | None | 5767 | 18.4 | MeOH |
| S1 | Ti(OiPr)$_4$ | 1 equiv. glycerol | 5455 | 20.4 | MeOH |
| S2 | Ti(OiPr)$_4$ | 3 equiv. glycerol | 6226 | 20.6 | iPrOH |
| S3 | Ti(OiPr)$_4$ | 3 equiv. EG | 6067 | 18.9 | iPrOH |
| S4 | Ti(OiPr)$_4$ | 3 equiv EG | 4695 | 19.9 | MeOH |

EG = ethylene glycol,
MeOH = methanol,
iPrOH = isopropanol

The results demonstrate the catalysts prepared with a polyol (i.e., RECs) do not appear to be significantly different in terms of polymerization activity or the melt index potential of the polymers produced when compared to the results observed when using a control catalyst prepared in the absence of a polyol.

Example 2

Figure 2:
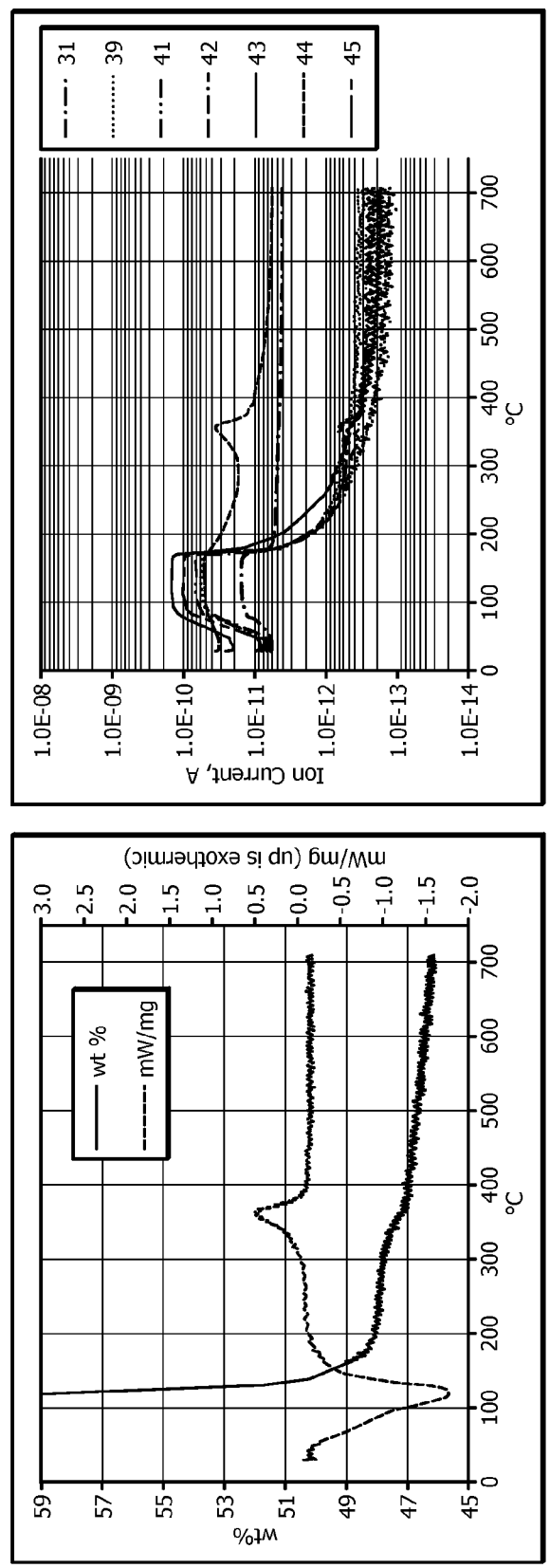

The emissions of HRVOCs for catalysts of the type disclosed herein (RECs) were investigated. Specifically, thermogravimetric and mass spectral analysis (TGA/MS) of catalysts of the type disclosed herein prepared in the presence or absence of a polyol were carried out. FIG. 1 depicts the TGA/MS spectrum of a Cr/silica-titania catalyst prepared with Ti(OiPr)$_4$ in the absence of a polyol (CONT). Referring to FIG. 1, on the right side of the figure there is a peak at ~250° C. from mass-to-charge ratio (m/z) signals of 39, 41, and 42 indicating the emission of propylene. FIG. 2 depicts the TGA/MS spectrum of a commercial Cr/silica catalyst that had been wetted with isopropanol, which from ~85° C. to 165° C. had peaks at m/z of 31, 39, 41, 42, 43, and 45. These results demonstrate that the signal observed in FIG. 1 is from propylene and not due to the loss of isopropanol from silica-bound titania.

Figure 3:
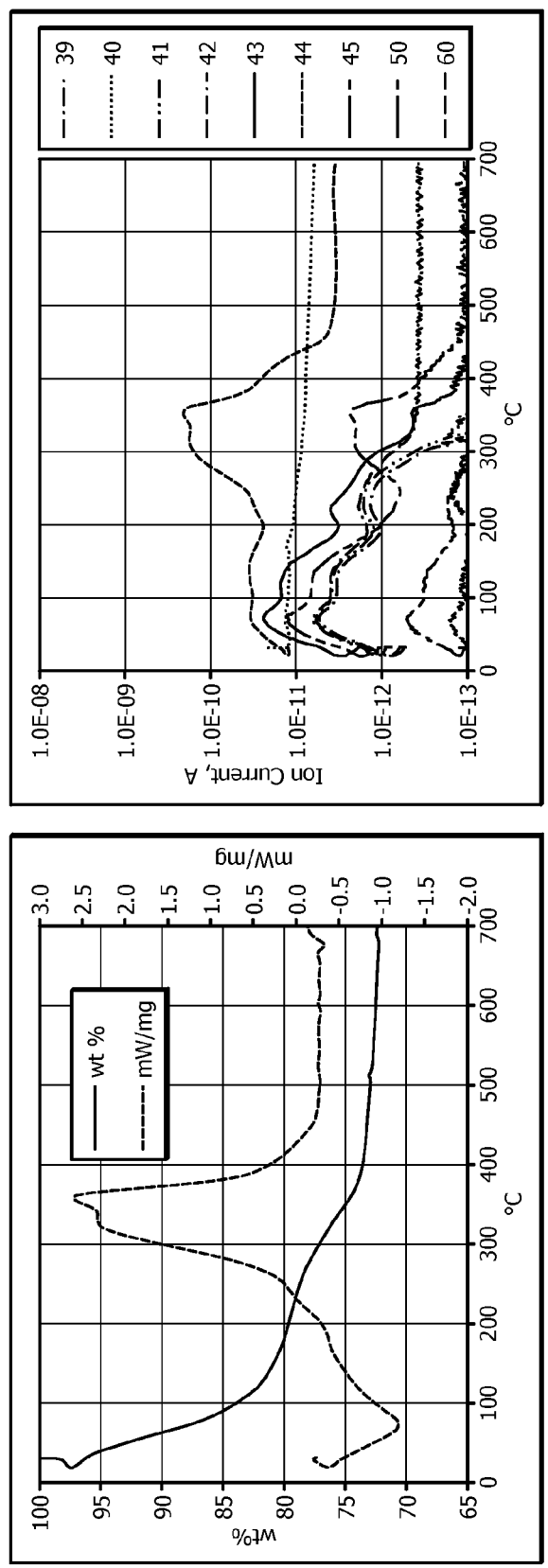

S1, which was a REC prepared in the presence of the polyol glycerol, and the solvent methanol, displayed what appeared to be a significant decrease in propylene production, see FIG. 3. The TGA/MS spectrum presented in FIG. 3 displays two losses of isopropanol. The first loss occurred at about 70° C. and the second occurred at about 130° C.

Without wishing to be limited by theory, the results suggest the first peak is likely due to the evaporation of free solvent while the second peak appears due to the loss of isopropanol physically adsorbed to the silica gel. A third broad peak, of much weaker intensity, occurred at around 225° C. and was comprised mainly of signals of m/z=39, 41, and 42 suggesting this was propylene.

Figure 4:
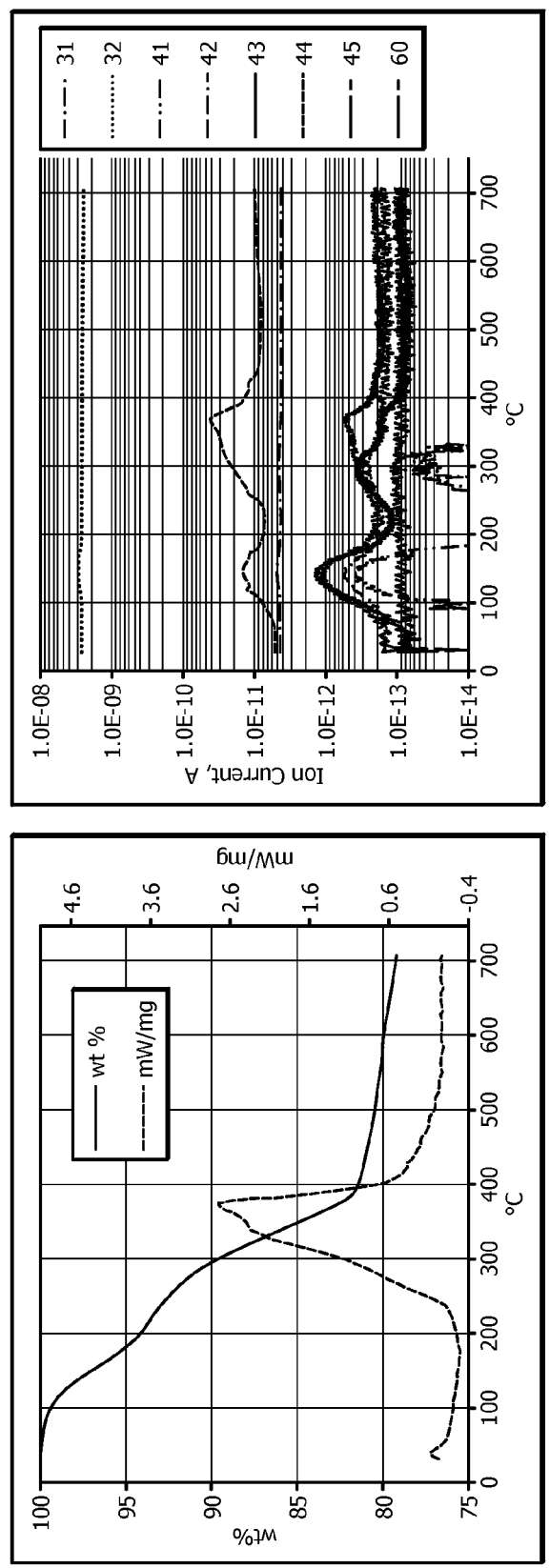

A second catalyst was prepared using 3 equivalents of glycerol and isopropanol as a solvent, S2. A TGA/MS spectrum of S2, FIG. 4, shows there are only two peaks before combustion of the organics, one at 145° C. corresponding to desorption of isopropanol and another at almost 300° C. The latter peak was comprised of signals of m/z=42, 43, and possibly 44, 45; however, this peak is shouldered on the peak for $CO_2$ that is present due to combustion of the organics. The observed signals are consistent with glycerol, which has a boiling point of 290° C., and there does not appear to be anything in the spectrum to suggest the production of propylene. The results indicate that glycerol is capable of replacing the isopropoxide ligands at titanium.

Figure 5:
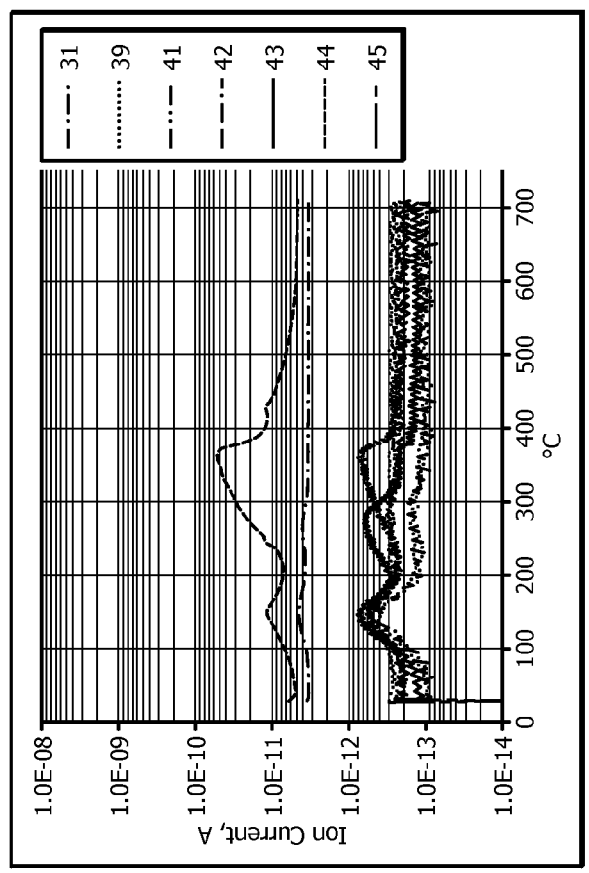
Figure 5:
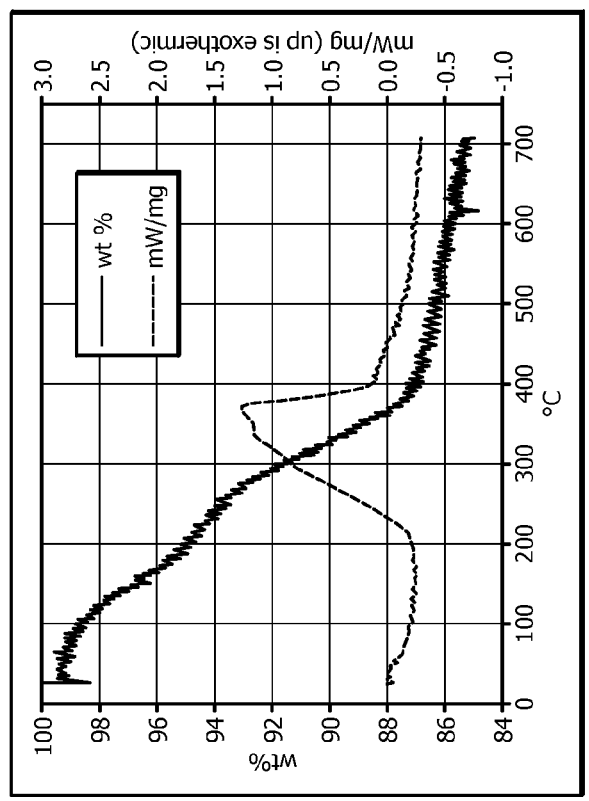

Similar results were observed when ethylene glycol was used in place of glycerol. The addition of three equivalents of the diol in both methanol and isopropanol, samples S3 and S4, respectively, resulted in undetectable amounts of propylene during TGA/MS analysis, see FIG. 5. In the TGA/MS spectra of the catalyst prepared in methanol, S3, isopropanol desorption is observed at about 150° C. followed by a peak at about 270° C. containing signals of m/z=43 and 44 which might be attributable to ethylene glycol. There did not however appear to be any sign of propylene production in the spectrum. Similar results were obtained when the catalyst was prepared in isopropanol.

The following are enumerated embodiments are provided as non-limiting examples:

A first embodiment which is a method comprising a) calcining a silica support at temperature in the range of from about 100° C. to about 500° C. to form a precalcined silica support; b) contacting the precalcined silica support with a titanium alkoxide to form a titanated support; c) subsequent to b), contacting the titanated support with a polyol to form a polyol associated titanated support (PATS); d) contacting at least one of the silica support, pre-calcined silica support, the titanated support, the PATS, or combinations thereof with a chromium-containing compound to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A second embodiment which is the method of the first embodiment wherein the polyol comprises ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or combinations thereof.

A third embodiment which is the method of any of the first through second embodiments wherein the polyol is present in an amount of from about 0.1 to about 10 molar equivalents per mole of titanium.

A fourth embodiment which is the method of any of the first through fourth embodiments wherein the HRVOC is an alkene compound.

A fifth embodiment which is the method of the fourth embodiment wherein the alkene compound is propylene.

A sixth embodiment which is the method of any of the first through fifth embodiments wherein an emission of the HRVOC is reduced by from about 50% to about 100% when compared to the emission of the HRVOC from a polymerization catalyst prepared by an otherwise similar process in the absence of the polyol.

A seventh embodiment which is the method of any of the first through sixth embodiments wherein the titanium alkoxide is a titanium tetra-alkoxide.

An eighth embodiment which is the method of any of the first through seventh embodiments wherein the titanium alkoxide comprises titanium isopropoxide.

A ninth embodiment which is the method of any of the first through eighth embodiments wherein the titanium alkoxide is present in an amount of from about 0.1 wt. % to about 10 wt. %.

A tenth embodiment which is the method of any of the first through ninth embodiments wherein the chromium-containing compound is added to the silica support.

An eleventh embodiment which is a method comprising contacting the polymerization catalyst produced by the method of the first embodiment with an olefin monomer in a reaction zone under conditions suitable to produce a polymer; and recovering the polymer.

A twelfth embodiment which is the method of the eleventh embodiment wherein the olefin monomer comprises ethylene and the polymer comprises polyethylene.

A thirteenth embodiment which is the method of any of the eleventh through twelfth embodiments wherein the reactor is a loop reactor.

A fourteenth embodiment which is a method comprising a) calcining a silica support at temperature in the range of from about 100° C. to about 500° C. to form a precalcined silica support; b) contacting the precalcined silica support with a titanium alkoxide to form a titanated support; c) subsequent to b), contacting the titanated support with a polyol to form a polyol associated titanated support (PATS); d) contacting the PATS with a chromium-containing compound to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A fifteenth embodiment which is the method of the fourteenth embodiment wherein the polyol comprises ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or combinations thereof.

A sixteenth embodiment which is the method of any of the fourteenth through fifteenth embodiments wherein the polyol is present in an amount of from about 0.1 to about 10 molar equivalents per mole of titanium.

A seventeenth embodiment which is the method of any of the fourteenth through sixteenth embodiments wherein the HRVOC is hydrocarbons, aromatic compounds, alcohols, ketones, or combinations thereof.

An eighteenth embodiment which is the method of the seventeenth embodiment wherein the HRVOC is propylene.

A nineteenth embodiment which is the method of any of the fourteenth through eighteenth embodiments wherein an emission of the HRVOC is reduced by from about 50% to about 100% when compared to the emission of the HRVOC from a polymerization catalyst prepared by an otherwise similar process in the absence of the polyol.

A twentieth embodiment which is the method of the eighteenth embodiment wherein propylene emissions range from about 50 wt. % to about less than 1 wt. % based on the weight percent titanium.

A twenty-first embodiment which is the method of any of the fourteenth through twentieth embodiments wherein the titanium isopropoxide is present in an amount of from about 0.1 wt. % to about 10 wt. %.

A twenty-second embodiment which is a method comprising a) calcining a silica support at temperature in the range of from about 100° C. to about 500° C. to form a precalcined silica support; b) contacting the precalcined silica support with a chromium-containing compound to form a Cr/silica support; c) contacting the Cr/silica support with a titanium alkoxide to form a titanated support; d) subsequent to c), contacting the titanated support with a polyol to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A twenty-third embodiment which is a method comprising a) calcining a silica support at temperature in the range of from about 100° C. to about 500° C. to form a precalcined silica support; b) contacting the precalcined silica support with a titanium alkoxide to form a titanated support; c) contacting the titanated support with a chromium-containing compound to form a Cr/Ti support; d) subsequent to c), contacting the Cr/Ti support with a polyol to form a polymerization catalyst precursor; e) drying the polymerization catalyst precursor to form a dried polymerization catalyst precursor; and f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

A twenty-fourth embodiment which is a method comprising a) calcining a Cr/silica support at temperature in the range of from about 100° C. to about 500° C. to form a precalcined support; b) contacting the precalcined support with a titanium alkoxide to form a titanated support; c) subsequent to b), contacting the titanated support with a polyol to form a polyol associated titanated support (PATS); d) drying the PATS to form a dried polymerization catalyst precursor; and e) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

While various embodiments have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:
1. A method comprising:
   a) calcining a silica support at temperature in the range of from about 100° C. to about 500° C. to form a precalcined silica support;
   b) contacting the precalcined silica support with a titanium alkoxide to form a titanated support;

c) subsequent to b), contacting the titanated support with a polyol to form a polyol associated titanated support (PATS);
d) contacting at least one of the silica support, pre-calcined silica support, the titanated support, the PATS, or combinations thereof with a chromium-containing compound to form a polymerization catalyst precursor;
e) drying the polymerization catalyst precursor to form a dried polymerization catalyst precursor; and
f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

2. The method of claim 1 wherein the polyol comprises ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or combinations thereof.

3. The method of claim 1 wherein the polyol is present in an amount of from about 0.1 to about 10 molar equivalents per mole of titanium.

4. The method of claim 1 wherein the HRVOC is an alkene compound.

5. The method of claim 4 wherein the alkene compound is propylene.

6. The method of claim 1 wherein an emission of the HRVOC is reduced by from about 50% to about 100% when compared to the emission of the HRVOC from a polymerization catalyst prepared by an otherwise similar process in the absence of the polyol.

7. The method of claim 1 wherein the titanium alkoxide is a titanium tetra-alkoxide.

8. The method of claim 1 wherein the titanium alkoxide comprises titanium isopropoxide.

9. The method of claim 1 wherein the titanium alkoxide is present in an amount of from about 0.1 wt. % to about 10 wt. %.

10. The method of claim 1 wherein the chromium-containing compound is added to the silica support.

11. A method comprising contacting the polymerization catalyst produced by the method of claim 1 with (i) an olefin monomer and (ii) an optional comonomer in a reaction zone under conditions suitable to produce a polymer; and recovering the polymer.

12. The method of claim 11 wherein the olefin monomer comprises ethylene and the polymer comprises polyethylene.

13. The method of claim 11 wherein the reaction zone is a loop reactor.

14. A method comprising:
a) calcining a silica support at temperature in the range of from about 100° C. to about 500° C. to form a precalcined silica support;
b) contacting the precalcined silica support with a titanium alkoxide to form a titanated support;
c) subsequent to b), contacting the titanated support with a polyol to form a polyol associated titanated support (PATS);
d) contacting the PATS with a chromium-containing compound to form a polymerization catalyst precursor;
e) drying the polymerization catalyst precursor to form a dried polymerization catalyst precursor; and
f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

15. The method of claim 14 wherein the polyol comprises ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or combinations thereof.

16. The method of claim 14 wherein the polyol is present in an amount of from about 0.1 to about 10 molar equivalents per mole of titanium.

17. The method of claim 14 wherein the HRVOC is hydrocarbons, aromatic compounds, alcohols, ketones, or combinations thereof.

18. The method of claim 17 wherein HRVOC is propylene.

19. The method of claim 14 wherein an emission of the HRVOC is reduced by from about 50% to about 100% when compared to the emission of the HRVOC from a polymerization catalyst prepared by an otherwise similar process in the absence of the polyol.

20. The method of claim 18 wherein propylene emissions range from about 50 wt. % to about less than 1 wt. % based on the weight percent titanium.

21. The method of claim 8 wherein the titanium isopropoxide is present in an amount of from about 0.1 wt. % to about 10 wt. %.

22. A method comprising:
a) calcining a silica support at temperature in the range of from about 100° C. to about 500° C. to form a precalcined silica support;

b) contacting the precalcined silica support with a chromium-containing compound to form a Cr/silica support;
c) contacting the Cr/silica support with a titanium alkoxide to form a titanated support;
d) subsequent to c), contacting the titanated support with a polyol to form a polymerization catalyst precursor;
e) drying the polymerization catalyst precursor to form a dried polymerization catalyst precursor; and
f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

23. A method comprising:
a) calcining a silica support at temperature in the range of from about 100° C. to about 500° C. to form a precalcined silica support;
b) contacting the precalcined silica support with a titanium alkoxide to form a titanated support;
c) contacting the titanated support with a chromium-containing compound to form a Cr/Ti support;
d) subsequent to c), contacting the Cr/Ti support with a polyol to form a polymerization catalyst precursor;
e) drying the polymerization catalyst precursor to form a dried polymerization catalyst precursor; and
f) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

24. A method comprising:
a) calcining a Cr/silica support at temperature in the range of from about 100° C. to about 500° C. to form a precalcined support;
b) contacting the precalcined support with a titanium alkoxide to form a titanated support;
c) subsequent to b), contacting the titanated support with a polyol to form a polyol associated titanated support (PATS);
d) drying the PATS to form a dried polymerization catalyst precursor; and
e) calcining the dried polymerization catalyst precursor to produce a polymerization catalyst, wherein less than about 0.1 wt. % of a highly reactive volatile organic compound (HRVOC) is emitted during the calcining of the dried polymerization catalyst precursor.

25. The method of claim 14 wherein the titanium alkoxide comprises titanium isopropoxide.

26. The method of claim 22 wherein the titanium alkoxide comprises titanium isopropoxide.

27. The method of claim 23 wherein the titanium alkoxide comprises titanium isopropoxide.

28. The method of claim 24 wherein the titanium alkoxide comprises titanium isopropoxide.

* * * * *